(12) United States Patent
Just

(10) Patent No.: US 8,113,568 B2
(45) Date of Patent: Feb. 14, 2012

(54) COLLAPSIBLE ROOF ASSEMBLY FOR A PASSENGER VEHICLE

(75) Inventor: Jan Just, Bloomfield Hills, MI (US)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 174 days.

(21) Appl. No.: 12/689,528

(22) Filed: Jan. 19, 2010

(65) Prior Publication Data

US 2010/0187853 A1 Jul. 29, 2010

(30) Foreign Application Priority Data

Jan. 23, 2009 (DE) .......................... 10 2009 005 934

(51) Int. Cl.
*B60J 7/12* (2006.01)
(52) U.S. Cl. .................................. 296/107.01
(58) Field of Classification Search ............. 296/107.01, 296/107.08, 107.09, 107.16, 108, 112, 121, 296/122, 131, 132
See application file for complete search history.

(56) References Cited

U.S. PATENT DOCUMENTS

| | | | |
|---|---|---|---|
| 5,746,470 A | 5/1998 | Seel et al. | |
| 5,829,821 A | 11/1998 | Aydt et al. | |
| 6,168,224 B1 * | 1/2001 | Henn et al. | 296/136.06 |
| 6,921,125 B2 * | 7/2005 | Netzel et al. | 296/108 |
| 7,182,389 B2 | 2/2007 | Bruder et al. | |
| 7,441,824 B2 | 10/2008 | Schenk | |
| 2003/0034668 A1 * | 2/2003 | Quindt | 296/108 |
| 2005/0156449 A1 | 7/2005 | Bruder et al. | |
| 2006/0097540 A1 | 5/2006 | Schenk | |

FOREIGN PATENT DOCUMENTS

| | | |
|---|---|---|
| DE | 102004054160 A1 | 5/2006 |
| DE | 102005045213 A1 | 3/2007 |
| EP | 0949101 A2 | 10/1999 |
| WO | 03084773 A1 | 10/2003 |

* cited by examiner

*Primary Examiner* — Dennis Pedder
*Assistant Examiner* — Jason S Daniels
(74) *Attorney, Agent, or Firm* — Brooks Kushman P.C.

(57) ABSTRACT

A collapsible roof assembly for a vehicle includes a roof, an actuating linkage system, and a main bearing. The roof is movable between closed and opened positions relative to the vehicle body. The actuating linkage system has a guide rod connected at a first end to the roof for moving the roof between the closed and opened positions. The main bearing is connectable to the vehicle body. The main bearing has first and second bearing plates each having at least one corresponding connecting section. The corresponding connecting sections are connected together such that the first and second bearing plates are joined together with surface regions other than the corresponding connecting sections spaced apart from one another with a parallel spacing delimited by a cavity. The guide rod is articulately connected at a second end to the main bearing via a bearing pin extending through one of the corresponding connecting sections.

18 Claims, 5 Drawing Sheets

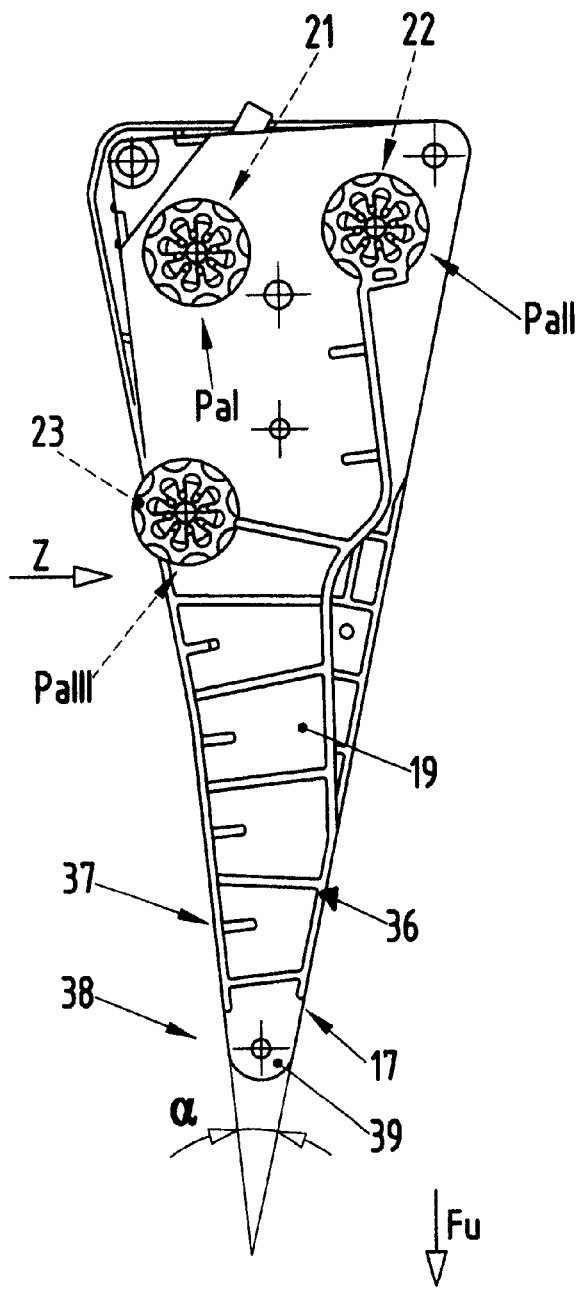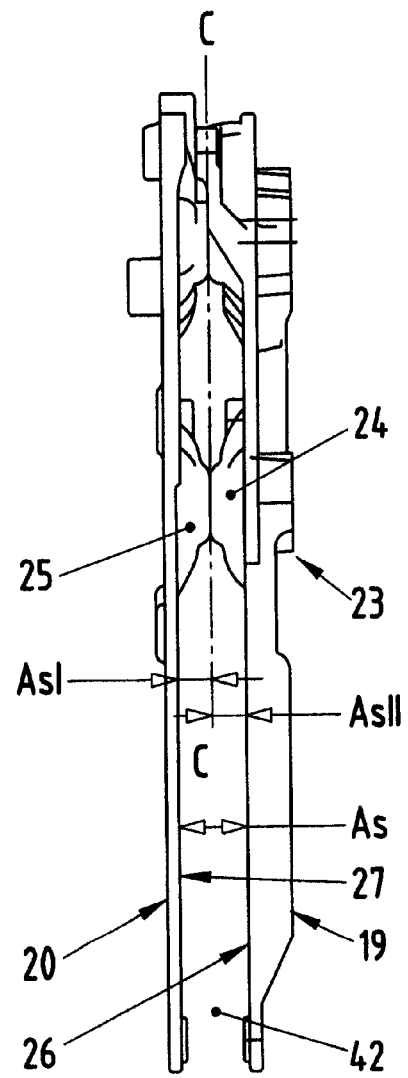
Fig. 3
Fig. 4

COLLAPSIBLE ROOF ASSEMBLY FOR A PASSENGER VEHICLE

CROSS-REFERENCE TO RELATED APPLICATIONS

This application claims foreign priority benefits under 35 U.S.C. §119(a)-(d) to DE 10 2009 005 934.2, filed Jan. 23, 2009, which is hereby incorporated by reference in its entirety.

BACKGROUND OF THE INVENTION

1. Field of the Invention

The present invention relates to a collapsible roof for a vehicle in which the roof is movable between closed and opened positions by an actuating linkage system articulately connected to the roof and a main bearing mounted on the vehicle.

2. Background Art

DE 44 45 580 C1 (corresponding to U.S. Pat. No. 5,746,470) describes a hardtop roof for a vehicle. The roof is movable via an interconnection with a linkage system. The linkage system has guide rods articulately connected to the roof section and to a main bearing mounted on the vehicle. The main bearing has a U-shaped cross-section with vertical legs having bearings for linkage mechanisms.

DE 44 41 666 C1 (corresponding to U.S. Pat. No. 5,829,821) describes a folding top for a vehicle. The folding top is movable via an interconnection with a folding top linkage. The linkage has a B-pillar guide rod and a main guide rod. The folding top bearing has an angular design and includes vertical and horizontal webs. Bearings for guide rods are on the vertical web.

DE 10 2005 045 213 A1 describes main bearings for a folding top linkage of a folding top. Each main bearing situated on either longitudinal side of the vehicle includes bearings for guide rods.

SUMMARY OF THE INVENTION

An object of the present invention is a collapsible roof for a vehicle in which the roof is movable between closed and opened positions by an actuating linkage system articulately connected to the roof and a main bearing in which the main bearing: has a simple construction with defined high absorption of forces on a folding top linkage of the actuating linkage system; may be manufactured at relatively low cost; and contributes to weight reduction.

In carrying out the above object and other objects, the present invention provides a collapsible roof assembly for a vehicle includes a roof, an actuating linkage system, and a main bearing. The roof is movable between closed and opened positions relative to the vehicle body. The actuating linkage system has a guide rod connected at a first end to the roof for moving the roof between the closed and opened positions. The main bearing is connectable to the vehicle body. The main bearing has first and second bearing plates each having at least one corresponding connecting section. The corresponding connecting sections are connected together such that the first and second bearing plates are joined together with surface regions other than the corresponding connecting sections spaced apart from one another with a parallel spacing delimited by a cavity. The guide rod is articulately connected at a second end to the main bearing via a bearing pin extending through one of the corresponding connecting sections.

In embodiments of the present invention, the main bearing is composed of two easily manufactured carrier or bearing plates whose design and composition represent a standard-setting framework having high strength. The bearing plates include connecting sections formed by projections compactly situated between the bearing plates. The bearing plates may be optimized with respect to weight by being manufactured from suitable plastic or metal. In the case of metal, a light alloy such as a magnesium alloy is suitable. Surface regions of the bearing plates have ribs to additionally reinforce the bearing plates. Lateral surfaces of the circular cylindrical connecting sections are supported by node webs to also additionally reinforce the bearing plates. Proper alignment of the main bearing is achieved as support devices on the carrier plates cooperate with corresponding support pins on the vehicle body.

The above features, and other features and advantages of the present invention are readily apparent from the following detailed descriptions thereof when taken in connection with the accompanying drawings.

BRIEF DESCRIPTION OF THE DRAWINGS

FIG. 3 illustrates a view in arrow direction Y of FIG. 2;

FIG. 4 illustrates a view in arrow direction Z of FIG. 3;

DETAILED DESCRIPTION OF THE PREFERRED EMBODIMENT(S)

Figure 1:
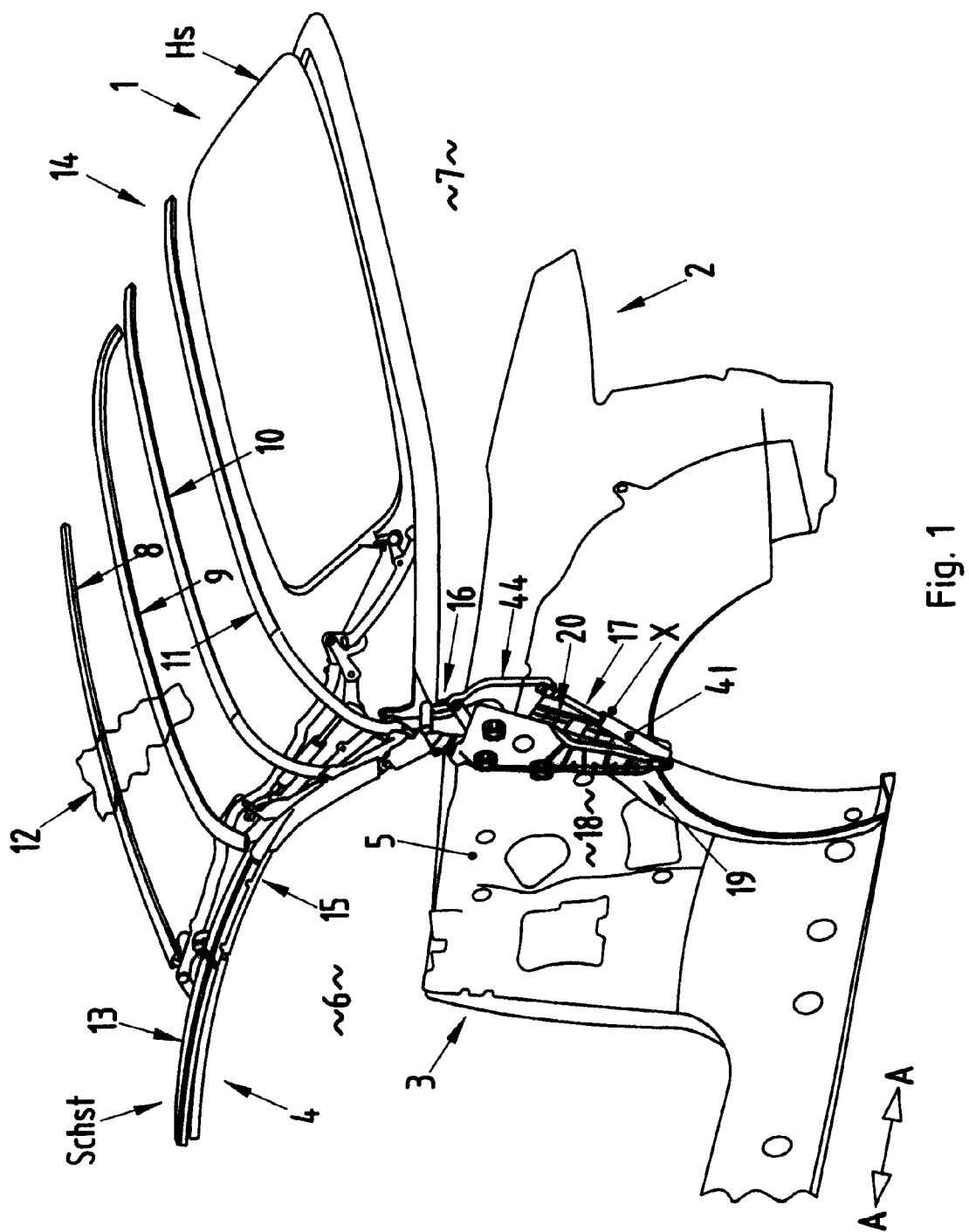
FIG. 1 illustrates a partial oblique view, seen from the left rear, of a passenger vehicle having a collapsible roof assembly in accordance with an embodiment of the present invention.

Referring now to FIG. 1, a passenger vehicle 1 having a collapsible roof assembly in accordance with an embodiment of the present invention is shown. Vehicle 1 includes a vehicle body 2 having a base body 3 on each of first and second longitudinal sides of vehicle body 2. Base body 3 has a wall structure 5 made of sheet metal or the like.

The collapsible roof assembly includes a roof 4. Roof 4 is movably supported on wall structure 5 of base body 3 on each of the longitudinal sides of vehicle body 2 to move between a closed position Schst and an opened position (not shown in FIG. 1). In the closed position, roof 4 spans a passenger compartment 6 of vehicle body 2. In the opened position, roof 4 is lowered into a storage space 7 of vehicle body 2. As such, roof 4 moves in the forward vehicle direction along vehicle longitudinal direction A-A when moving from the opened position to the closed position. Conversely, roof 4 moves in the rearward vehicle direction along vehicle longitudinal direction A-A when moving from the closed position to the opened position.

Roof 4 includes a set of bows 8, 9, 10, and 11 and a folding top cover 12. Bows 8, 9, 10, and 11 extend transversely to the vehicle longitudinal direction A-A between first and second longitudinal sides 13, 14 of roof 4. Bows 8, 9, 10, and 11 are connected to folding top cover 12. In the closed position, bows 8, 9, 10, and 11 support folding top cover 14 over passenger compartment 6 of vehicle body 2. Bow 11 delimits an upper boundary of a rear window Hs of folding top cover 12.

The collapsible roof assembly further includes a pair of actuating linkage systems. First actuating linkage system 16 is associated with first longitudinal side 13 of roof 4 and with the corresponding first longitudinal side of vehicle body 2. The other actuating linkage system is associated with second longitudinal side 14 of roof 4 and with the corresponding second longitudinal side of vehicle body 2. The actuating linkage systems movably connect roof 4 to vehicle body 2 to move roof 4 between the closed and opened positions.

Each actuating linkage system includes the same components. As such, first actuating linkage system 16 will be described in greater detail with the understanding that the second actuating linkage system has the same components.

First actuating linkage system 16 includes a guide rod system 15 having guide rods. The guide rods of guide rod system 15 are movably connected to one another to move between the closed and opened positions of roof 4. Bows 8, 9, 10, and 11 of roof 4 are connected on respective longitudinal sides 13, 14 of roof 4 between the guide rods of the guide rod systems of the actuating linkage systems. A guide rod 35 of guide rod system 15 is movably connected to wall structure 5 on the corresponding longitudinal side of vehicle body 2. As a result, the actuating linkage systems are connected via the guide rods of the respective guide rod systems with respective longitudinal sides 13, 14 of roof 4 and with respective longitudinal sides of vehicle body 2 to thereby movably connect roof 4 to vehicle body 2 such that roof 4 is movable between the closed and opened positions.

First actuating linkage system 16 includes a main bearing 17. Main bearing 17 is situated on a wall 18 of wall structure 5 of vehicle body 2 on the first longitudinal side of vehicle body 2. Guide rod 35 of guide rod system 15 of first actuating linkage system 16 connects with main bearing 17 to be movably connected to wall structure 5 on first longitudinal side of vehicle body 2. Likewise, the other actuating linkage system includes a main bearing which is identical to main bearing 17 and is similarly situated on the second longitudinal side of vehicle body 2.

Main bearing 17 includes first and second bearing plates 19, 20. Bearing plates 19, 20 are joined together and extend from one another in certain places with a parallel spacing As. Bearing plates 19, 20 include first, second, and third connecting sections 21, 22, and 23. Each connecting section is formed by projections 24, 25 respectively on bearing plates 19, 20 (see FIGS. 3 and 4). Projections 24, 25 are joined together in a common connection plane C-C. As such, bearing plates 19, are joined together at three connection points: projections 24, 25 of first connecting section 21, projections 24, 25 of second connecting section 22, and projections 24, 25 of third connecting section 23. Connection plane C-C extends at an equal distance AsI=AsII from mutually facing flat surfaces 26 and 27 of bearing plates 19, 20, respectively.

Bearing plates 19, 20 are planar components in which projections 24, 25 of each connecting section 21, 22, and 23 are integrated. Plastic or metal are suitable materials for bearing plates 19 and 20. In the case of metal, a light alloy such as a magnesium alloy is preferable.

Ribs 29, 30 are respectively provided over defined surface regions 26, 27 of bearing plates 19, 20 to increase the strength of the bearing plates. Ribs 29, 30 may be designed as latticed braces.

Figure 2:
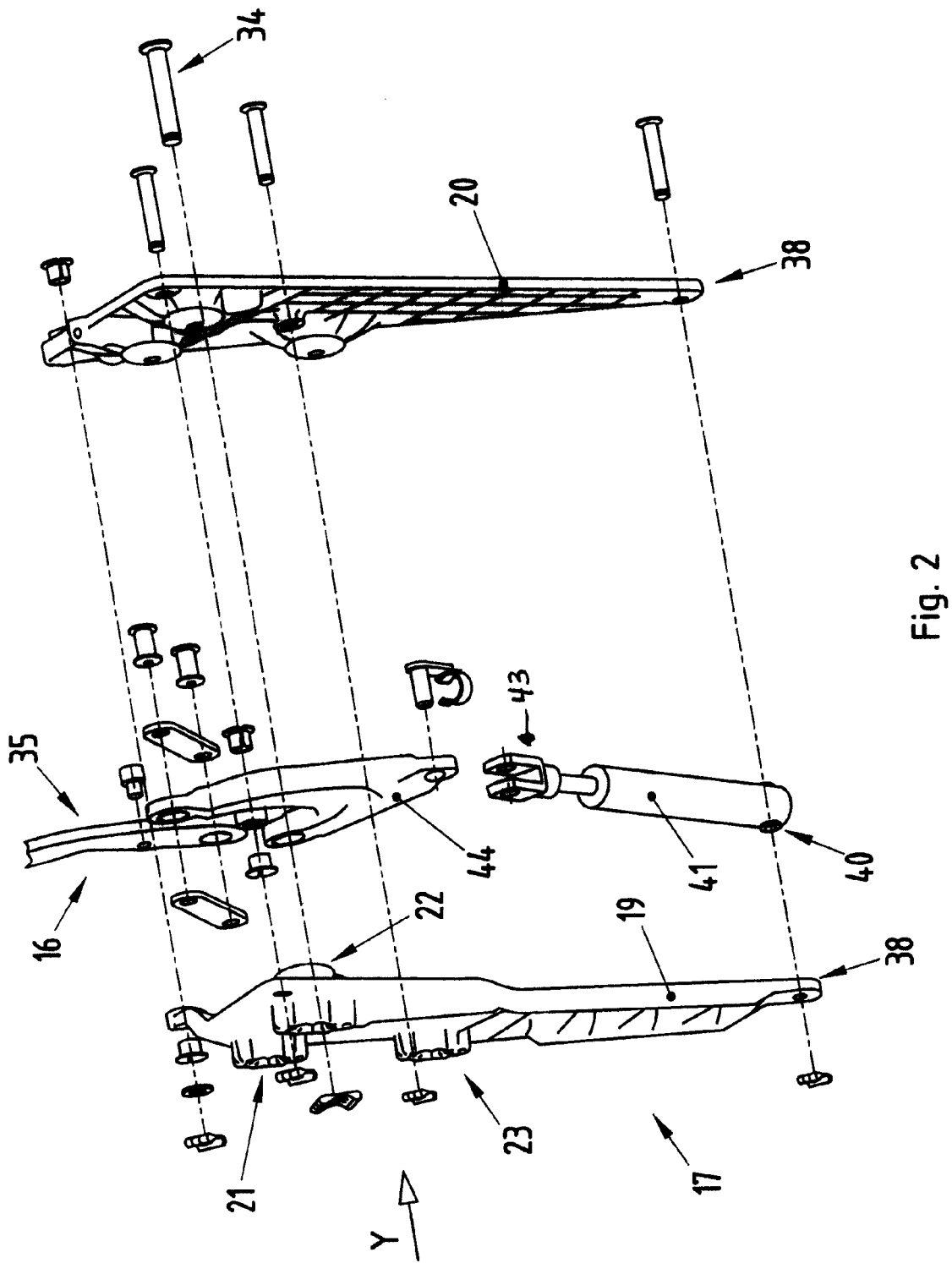
FIG. 2 illustrates detail X of FIG. 1 as an exploded illustration in enlarged scale.
Figure 5:
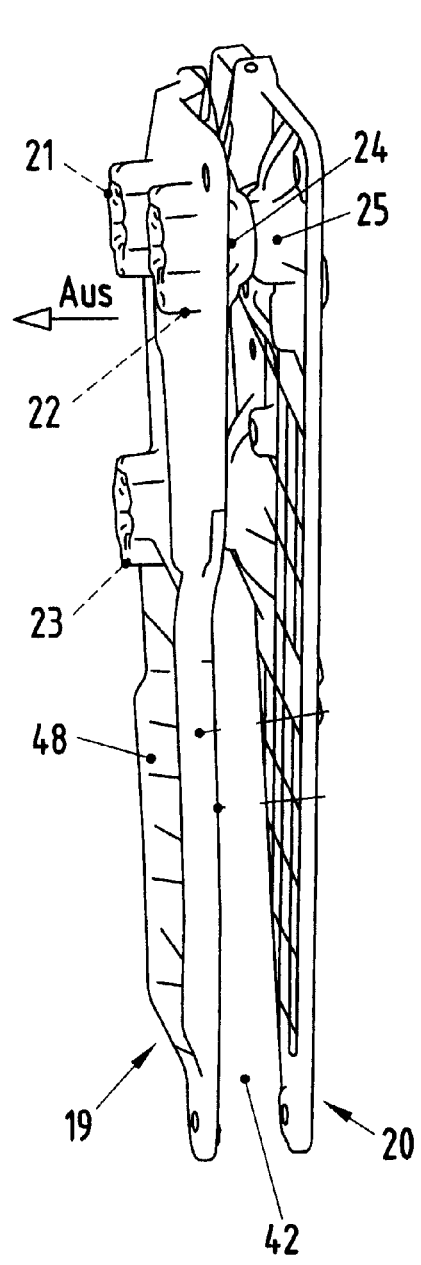
FIG. 5 illustrates an oblique view, seen from the left rear, of a main bearing of the collapsible roof assembly.

To avoid static redundancy, connecting sections 21, 22, 23 between bearing plates 19, 20 form a type of three-point support PaI, PaII, and PaIII (see FIG. 3). Each connecting section 21, 22, 23 has the shape of a circular cylinder 31 whose lateral surface 32 is supported against the surface region by node webs 33. In addition, each connecting sections 21, 22, 23 is designed for accommodating a respective bearing pin. For instance, second connecting section 22 accommodates a bearing pin 34 for guide rod 35 of guide rod system 15 of first actuating linkage system 16 (FIG. 2).

As viewed from the side, each bearing plate 19, 20 has a triangular shape. Boundary sides 36 and 37 of bearing plates 19, 20 taper toward the vehicle underbody Fu and define an acute angle α. At bearing 39 is located at a lower end region 38 of each bearing plate 19, 20. Bearing 39 of each bearing plate 19, 20 is for receiving a first end 40 of an actuating cylinder 41 extending within a cavity 42 formed by the interspaced bearing plates 19, 20. A second end 43 of actuating cylinder 41 cooperates with a drive lever 44 of actuating linkage system 16 such that drive lever 44 is movably mounted on main bearing 17.

Figure 6:
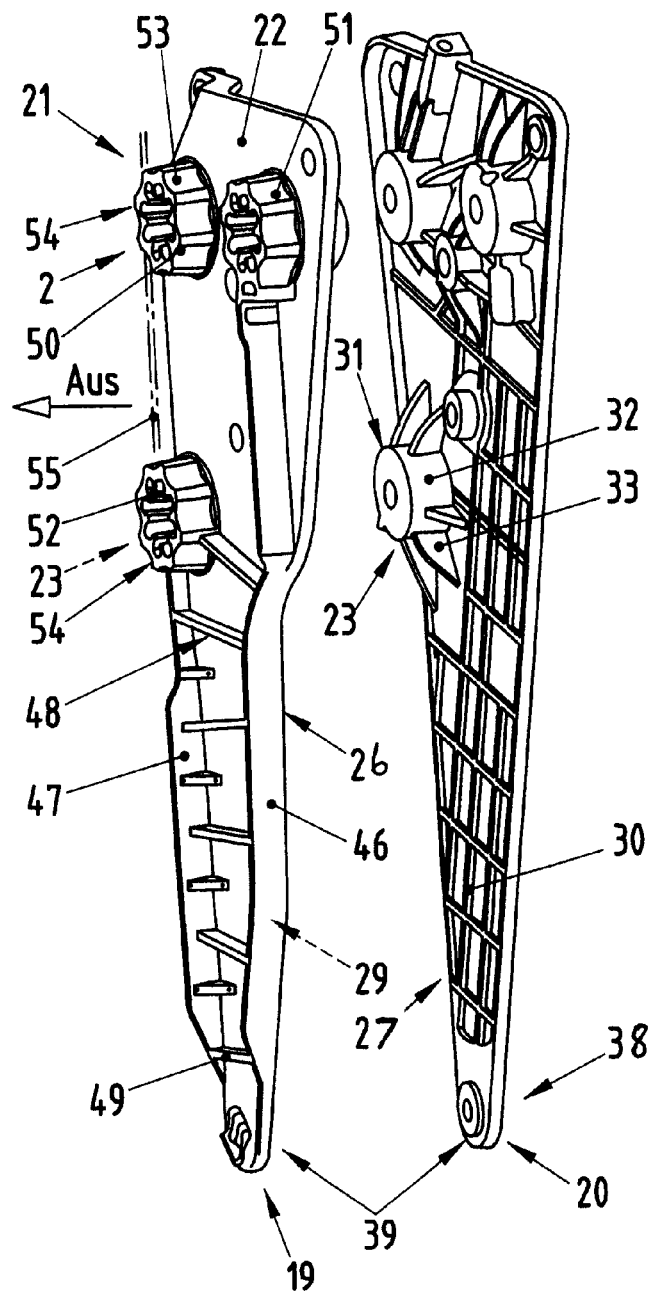
FIG. 6 illustrates an exploded illustration of FIG. 5.
Figure 7:
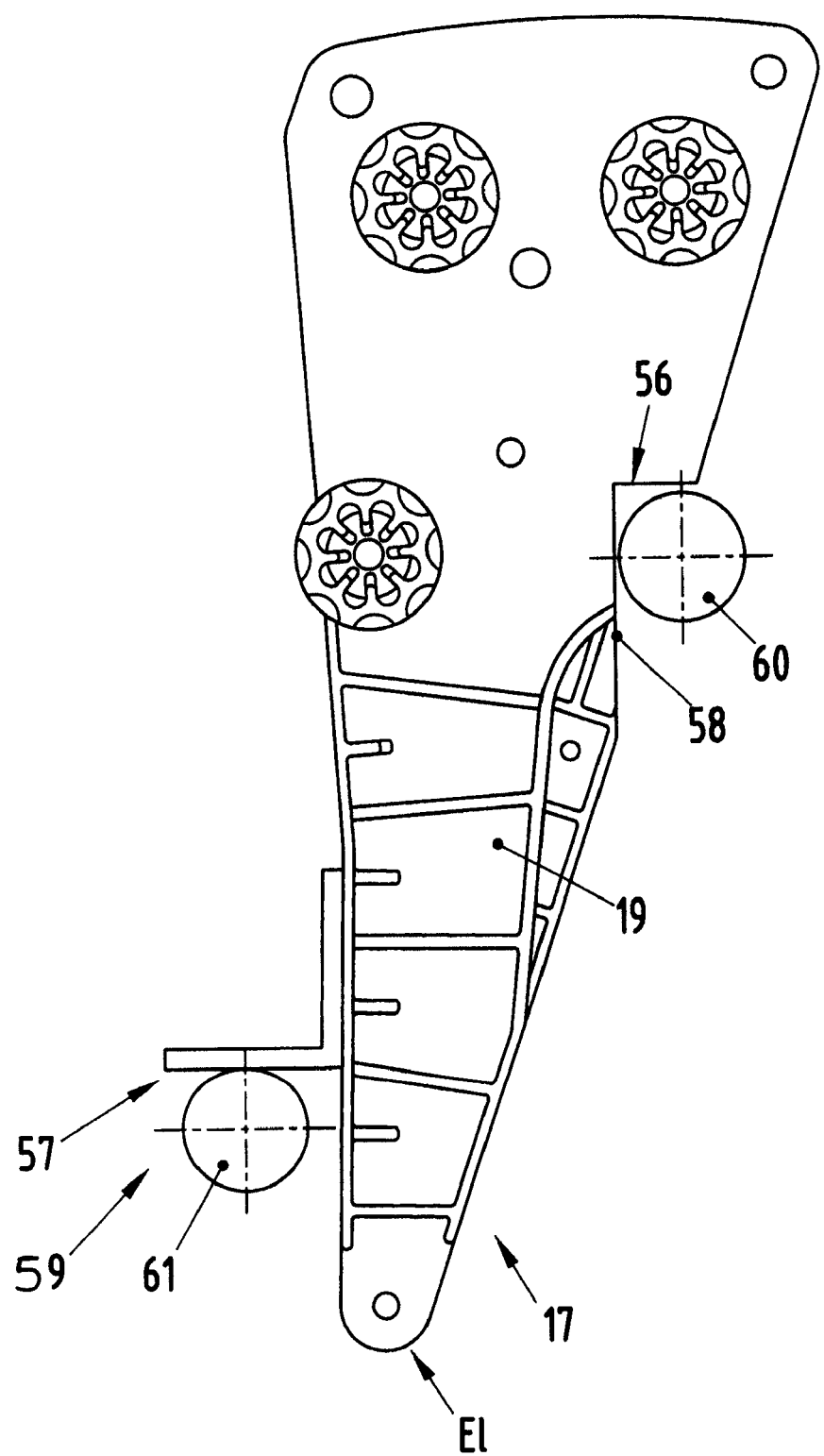
FIG. 7 illustrates a schematic side view of the main bearing together with a support device and a support pin.

Boundary sides 36, 37 of at least one bearing plate such as bearing plate 19 have bent sections 46 and 47 on the side 45 facing away from cavity 42. Bent sections 46, 47 are supported by connecting webs 48 and node webs 49. According to FIG. 6, in the region of connecting sections 21, 22, and 23, bearing plate 19 includes extensions 50, 51, and 52 which face the outer side Aus and which include ring-shaped gear teeth 53. Free ends 54 of extensions 51, 52, and 53 contact a wall section 55 of wall structure 5 of vehicle body 2.

Support devices 58 and 59 respectively in the form of recesses 56 and stops 57 are incorporated at the boundary sides 36, 37 of bearing plates 19, 20. Support devices 58, 59 respectively cooperate with fixed support pins 60 and 61 of vehicle body. Main bearing 17 is inserted from above, between support pins 60, 61, into an intended end position E1.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A collapsible roof assembly for a vehicle, the assembly comprising:
   a roof movable between a closed position and an opened position relative to the vehicle body;
   an actuating linkage system having a guide rod connected at a first end to the roof for moving the roof between the closed and opened positions; and
   a main bearing connectable to the vehicle body, the main bearing having first and second bearing plates, the first and second bearing plates each having at least one corresponding connecting section, wherein the corresponding connecting sections are connected together such that the first and second bearing plates are joined together with surface regions other than the corresponding connecting sections spaced apart from one another with a parallel spacing delimited by a cavity;
   wherein the guide rod is articulately connected at a second end to the main bearing via a bearing pin extending through one of the corresponding connecting sections;
   wherein the first and second bearing plates each having first, second, and third corresponding connection sections which are connected together to provide a three-point support.

2. A collapsible roof assembly for a vehicle, the assembly comprising:

a roof movable between a closed position and an opened position relative to the vehicle body;

an actuating linkage system having a guide rod connected at a first end to the roof for moving the roof between the closed and opened positions; and a main bearing connectable to the vehicle body, the main bearing having first and second bearing plates, the first and second bearing plates each having at least one corresponding connecting section, wherein the corresponding connecting sections are connected together such that the first and second bearing plates are joined together with surface regions other than the corresponding connecting sections spaced apart from one another with a parallel spacing delimited by a cavity;

wherein the guide rod is articulately connected at a second end to the main bearing via a bearing pin extending through one of the corresponding connecting sections;

wherein each of the corresponding connecting sections includes a first projection and a second projection which are connected together to join the first and second bearing plates together, wherein the first projection is on the first bearing plate and the second projection is on the second bearing plate.

3. The assembly of claim 2 wherein:
the first and second projections are connected together in a common connection plane.

4. The assembly of claim 2 wherein:
the bearing plates are planar components in which the first and second projections are integrated.

5. The assembly of claim 1 wherein:
the bearing plates are made of at least one of plastic and metal.

6. The assembly of claim 1 wherein:
the bearing plates are made of a magnesium alloy.

7. The assembly of claim 1 wherein:
the surface regions of the bearing plate have reinforcement ribs.

8. A collapsible roof assembly for a vehicle, the assembly comprising:

a roof movable between a closed position and an opened position relative to the vehicle body;

an actuating linkage system having a guide rod connected at a first end to the roof for moving the roof between the closed and opened positions; and a main bearing connectable to the vehicle body, the main bearing having first and second bearing plates, the first and second bearing plates each having at least one corresponding connecting section, wherein the corresponding connecting sections are connected together such that the first and second bearing plates are joined together with surface regions other than the corresponding connecting sections spaced apart from one another with a parallel spacing delimited by a cavity;

wherein the guide rod is articulately connected at a second end to the main bearing via a bearing pin extending through one of the corresponding connecting sections;

wherein each of the corresponding connecting sections has the shape of a circular cylinder whose lateral surface is supported against an adjacent surface region of the associated bearing plate by node webs.

9. The assembly of claim 1 wherein:
each bearing plates has a triangular shape and boundary sides of the bearing plate taper to define an acute angle at the apex of the triangular shape.

10. The assembly of claim 1 further comprising:
an actuating cylinder extending within the cavity;
wherein each bearing plates includes a bearing for a first end of the actuating cylinder.

11. The assembly of claim 10 further comprising:
a drive lever supported on the main bearing and connected to the second end of the guide rod;
wherein a second end of the actuating cylinder cooperates with the drive lever.

12. The assembly of claim 9 wherein:
the boundary sides of at least one bearing plate have bent sections on a side facing away from the cavity.

13. The assembly of claim 12 wherein:
the bent sections are supported by connecting webs or node webs.

14. The assembly of claim 1 wherein:
in the region of the corresponding connecting sections, the bearing plates have extensions having ring-shaped gear teeth.

15. The assembly of claim 1 wherein:
at least one of the bearing plates includes a support device for a support pin connected to the vehicle body.

16. The assembly of claim 1 wherein:
the bearing plates have support devices for support pins of the vehicle body.

17. A vehicle comprising:
a vehicle body having a passenger compartment and a storage space;
a roof;
an actuating linkage system having a guide rod movably connecting the roof to the vehicle body for moving the roof between a closed position in which the roof spans the passenger compartment and an opened position in which the roof is lowered into the storage space, wherein the guide rod is articulately connected at a first end to the roof; and a main bearing mounted to the vehicle body, the main bearing having first and second bearing plates each having at least one corresponding connecting section, wherein the corresponding connecting sections are connected together such that the first and second bearing plates are joined together with surface regions other than the corresponding connecting sections spaced apart from one another with a parallel spacing delimited by a cavity;

wherein the guide rod is articulately connected at a second end to the main bearing via a bearing pin extending through one of the corresponding connecting sections;

wherein the first and second bearing plates each having first, second, and third corresponding connection sections which are connected together to provide a three-point support.

18. The vehicle of claim 17 further comprising:
an actuating cylinder extending within the cavity;
a drive lever supported on the main bearing and connected to the second end of the guide rod;
wherein each bearing plates includes a bearing connected to a first end of the actuating cylinder and a second end of the actuating cylinder cooperates with the drive lever.

* * * * *